(12) United States Patent
Xu et al.

(10) Patent No.: US 10,996,098 B2
(45) Date of Patent: May 4, 2021

(54) VEHICLE LOAD METERING DEVICE

(71) Applicant: Goldver Tech Systems Co. Ltd, Chupei (TW)

(72) Inventors: Mengbiao Xu, Wuxi (CN); Yonglong Xu, Nanjing (CN)

(73) Assignee: Goldver Tech Systems Co. Ltd., Chupei (TW)

( * ) Notice: Subject to any disclaimer, the term of this patent is extended or adjusted under 35 U.S.C. 154(b) by 182 days.

(21) Appl. No.: 16/504,732

(22) Filed: Jul. 8, 2019

(65) Prior Publication Data

US 2019/0360854 A1 Nov. 28, 2019

Related U.S. Application Data

(63) Continuation-in-part of application No. 15/543,645, filed as application No. PCT/CN2015/071077 on Jan. 20, 2015, now abandoned.

(51) Int. Cl.
*G01G 19/10* (2006.01)
*G01L 1/02* (2006.01)
*B60G 17/00* (2006.01)

(52) U.S. Cl.
CPC .............. *G01G 19/10* (2013.01); *G01L 1/02* (2013.01); *B60G 2400/51* (2013.01); *B60G 2400/60* (2013.01)

(58) Field of Classification Search
CPC ........ G01G 19/08; G01G 19/10; G01G 19/12; G01G 5/003; G01G 7/02; G01G 9/00; G01G 19/02; G01G 19/021; B60G 2400/51; B60G 2400/60; B60G 2400/61; G01L 1/02
See application file for complete search history.

(56) References Cited

U.S. PATENT DOCUMENTS

| 1,432,631 A | 10/1922 | Sonnlechner et al. |
| 1,956,096 A | 4/1934 | Goodale |
| 2,225,182 A | 12/1940 | Ratliff |
| 2,450,644 A | 10/1948 | Donaldson |
| 2,452,124 A | 10/1948 | Huston et al. |
| 2,490,860 A | 12/1949 | Donaldson |
| 2,684,594 A | 7/1954 | Furcini |
| 2,756,983 A | 7/1956 | Furcini |

(Continued)

FOREIGN PATENT DOCUMENTS

| CN | 202782852 U | 3/2013 |
| CN | 204535832 U | 8/2015 |

*Primary Examiner* — Randy W Gibson
(74) *Attorney, Agent, or Firm* — Alan D. Kamrath; Karin L. Williams; Mayer & Williams PC

(57) ABSTRACT

A vehicle load metering device has a displacement sensing module, a signal processing/transmission module, and a signal receiving/processing module. The displacement sensing module has multiple displacement sensors respectively mounted on flexible supporting devices of a vehicle suspension system. Each displacement sensor is connected to two supporting boards of the corresponding flexible supporting device to meter amount of displacement between the two supporting boards. The signal processing/transmission module transmits the signals that are detected by the displacement sensors to the signal receiving/processing module. The present invention provides a vehicle load metering device that may assemble on the vehicle conveniently and detect the load of the vehicle accurately.

4 Claims, 16 Drawing Sheets

(56) References Cited

U.S. PATENT DOCUMENTS

| | | |
|---|---|---|
| 2,867,433 A | 1/1959 | Bergenheim et al. |
| 2,931,638 A | 4/1960 | Weber |
| 3,078,937 A | 2/1963 | Mehki et al. |
| 3,092,818 A | 6/1963 | Potschka |
| 3,109,505 A | 11/1963 | Davis |
| 3,150,729 A | 9/1964 | Mehki |
| 3,151,692 A | 10/1964 | Dysart |
| 3,167,142 A | 1/1965 | Meneely |
| 3,420,325 A | 1/1969 | McAlister et al. |
| 3,428,139 A | 2/1969 | Nolan |
| 3,508,623 A | 4/1970 | Greenstein |
| 3,545,558 A | 12/1970 | Maugh |
| 3,648,790 A | 3/1972 | Bishop |
| 3,794,130 A | 2/1974 | Malmgren et al. |
| 3,857,093 A | 12/1974 | Green |
| 4,106,579 A | 8/1978 | Hayes, Sr. et al. |
| 4,219,088 A | 8/1980 | Finney |
| 4,375,839 A | 3/1983 | Manning et al. |
| 4,606,419 A | 8/1986 | Perini |
| 4,630,227 A | 12/1986 | Hagenbuch |
| 4,632,029 A | 12/1986 | Simeth |
| 4,706,768 A | 11/1987 | Kozozian et al. |
| 4,852,674 A | 8/1989 | Gudat |
| 4,917,197 A | 4/1990 | Waite, Jr. |
| 5,127,637 A | 7/1992 | Castel |
| 5,161,628 A | 11/1992 | Wirth |
| 5,811,738 A | 9/1998 | Boyovich et al. |
| 6,259,041 B1 | 7/2001 | Dohrmann |
| 6,921,100 B2 | 7/2005 | Mantini et al. |
| 7,816,613 B2 | 10/2010 | Kallonen |
| 7,881,903 B2 | 2/2011 | Chen |

VEHICLE LOAD METERING DEVICE

BACKGROUND OF THE INVENTION

1. Field of the Invention

The present invention relates to a vehicle load metering device, and more particularly to a vehicle load metering device that may be assembled on a flexible supporting device of a vehicle suspension system to meter the load of the vehicle instantly and automatically without manual measurement, may record the measurement results in a traffic recorder by a signal transmission manner, or may store the measurement data in a data center via a communication network so as to carry out the logistics management.

2. Description of Related Art

In order to avoid overloading heavy loads of conventional vehicles to generate doubt on security, a portable scale is deposited on the conventional vehicle by manual means to monitor the load of the conventional vehicle. However, the load of the conventional vehicle only can be metered under a quiescent state, and cannot be carried out the load condition of the vehicle immediately in a process of moving. In addition, the portable scale is needed to be disassembled from the vehicle after metering the load of the vehicle, and this is inconvenient in use.

To overcome the shortcomings, the present invention provides a vehicle load metering device to mitigate or obviate the aforementioned problems.

SUMMARY OF THE INVENTION

The main objective of the present invention is to provide a vehicle load metering device, and more particularly to a vehicle load metering device that may be assembled on a flexible supporting device of a vehicle suspension system to meter the load of the vehicle instantly and automatically without manual measurement, may record the measurement results in a traffic recorder by a signal transmission manner, or may store the measurement data in a data center via a communication network so as to carry out the logistics management.

The vehicle load metering device has a displacement sensing module, a signal processing/transmission module, and a signal receiving/processing module. The displacement sensing module has multiple displacement sensors respectively mounted on flexible supporting devices of a vehicle suspension system. Each displacement sensor is connected to two supporting boards of the corresponding flexible supporting device to meter an amount of displacement between the two supporting boards. The signal processing/transmission module transmits the signals that are detected by the displacement sensors to the signal receiving/processing module. The present invention provides a vehicle load metering device that may assemble on the vehicle conveniently and detect the load of the vehicle accurately.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
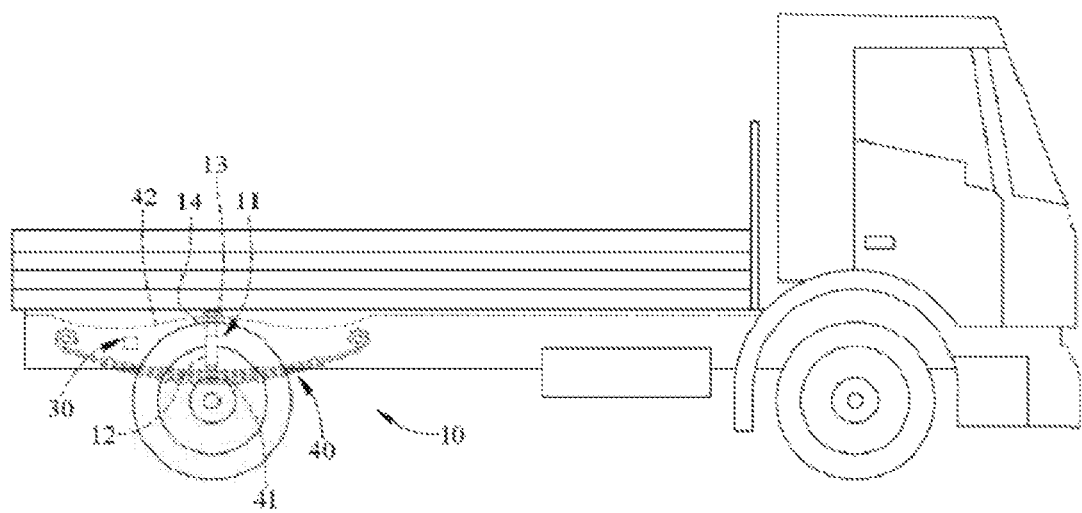
FIG. 1 is an operational side view of a vehicle load metering device in accordance with the present invention, assembled on a flexible supporting device of a vehicle suspension system.

With reference to FIG. 1, a vehicle load metering device in accordance with the present invention is assembled on each one of the flexible supporting devices 40 of a vehicle suspension system between two supporting boards 41, 42, and has a displacement sensing module 10, a signal processing/transmission module 20, and a signal receiving/processing module 30.

The displacement sensing module 10 has multiple displacement sensors 11 respectively mounted on the flexible supporting devices 40 of the vehicle suspension system. That is, the number of the displacement sensors 11 of the displacement sensing module 10 is same as the number of the flexible supporting devices 40 of the vehicle suspension system. Each one of the displacement sensors 11 is connected to the two supporting boards 41, 42 of a corresponding flexible supporting device 40 to detect a displacement amount of the upper and lower ends of the two supporting boards 41, 42. For example, a distance between the two supporting boards 41, 42 may be defined between 200 and 350 millimeters. Each one of the displacement sensors 11 has a fixing element 12, a moving element 13, and a detecting module 14. The fixing element 12 is connected to a lower one of the supporting boards 41, 42 (hereinafter referred to as the lower supporting board 41) of the corresponding flexible supporting device 40. The moving element 13 is connected to an upper one of the supporting boards 41, 42 (hereinafter referred to as the upper supporting board 42) of the corresponding flexible supporting device 40, and is movably connected to the fixing element 12. The detecting module 14 is deposited between the fixing element 12 and the moving element 13 to detect a displacement amount of the moving element 13 relative to the fixing element 12. Preferred embodiments of the displacement sensors 11 of the present invention will be described as follow.

Figure 2:
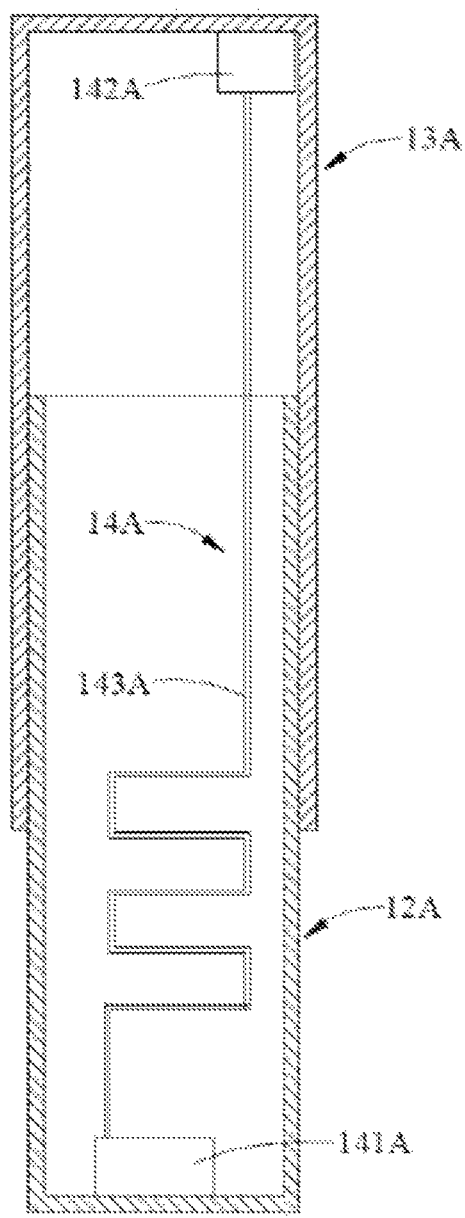
FIG. 2 is a side view in partial section of a first embodiment of a vehicle load metering device in accordance with the present invention.

With reference to FIG. 2, a first embodiment of a displacement sensor 11 in the present invention is a pressure displacement sensor, the fixing element 12A is a hollow tube with an upper opening, and the moving element 13A is a hollow pipe with a lower opening and is mounted around the fixing element 12A. The detecting module 14A has a pressure transmitter 141A, an oil storage box 142A, and a connecting hose 143A. The pressure transmitter 141A is securely mounted in the fixing element 12A. The oil storage box 142A is securely mounted in the moving element 13A and stores oil. The connecting hose 143A is connected to the pressure transmitter 141A and the oil storage box 142A.

In use, when the upper supporting board 42 of the flexible supporting device 40 is moved downwardly relative to the lower supporting board 41 by the load of the vehicle, the moving element 13A is moved with the upper supporting board 42, and this enables the oil storage box 142A is moved with the moving element 13A relative to the pressure transmitter 141A. Then, the pressure transmitter 141A generates a signal of pressure change of the potential energy according to the position of the oil storage box 142A, and the amount of movement of the moving element 13A relative to the fixing element 12A can be converted by the signal of pressure change of the potential energy. The amount of movement is also the amount of displacement of the upper supporting board 42 relative to the lower supporting board 41, and the load of the vehicle can be calculated by the amount of displacement. For example, when the load of the vehicle is increased to reduce the height of the oil storage box 142A, and the signal of pressure change of the potential energy that is generated by the pressure transmitter 141A is smaller. On the contrary, when the load of the vehicle is reduced to increase the height of the oil storage box 142A, and the signal of pressure change of the potential energy that is generated by the pressure transmitter 141A is larger.

Figure 9:
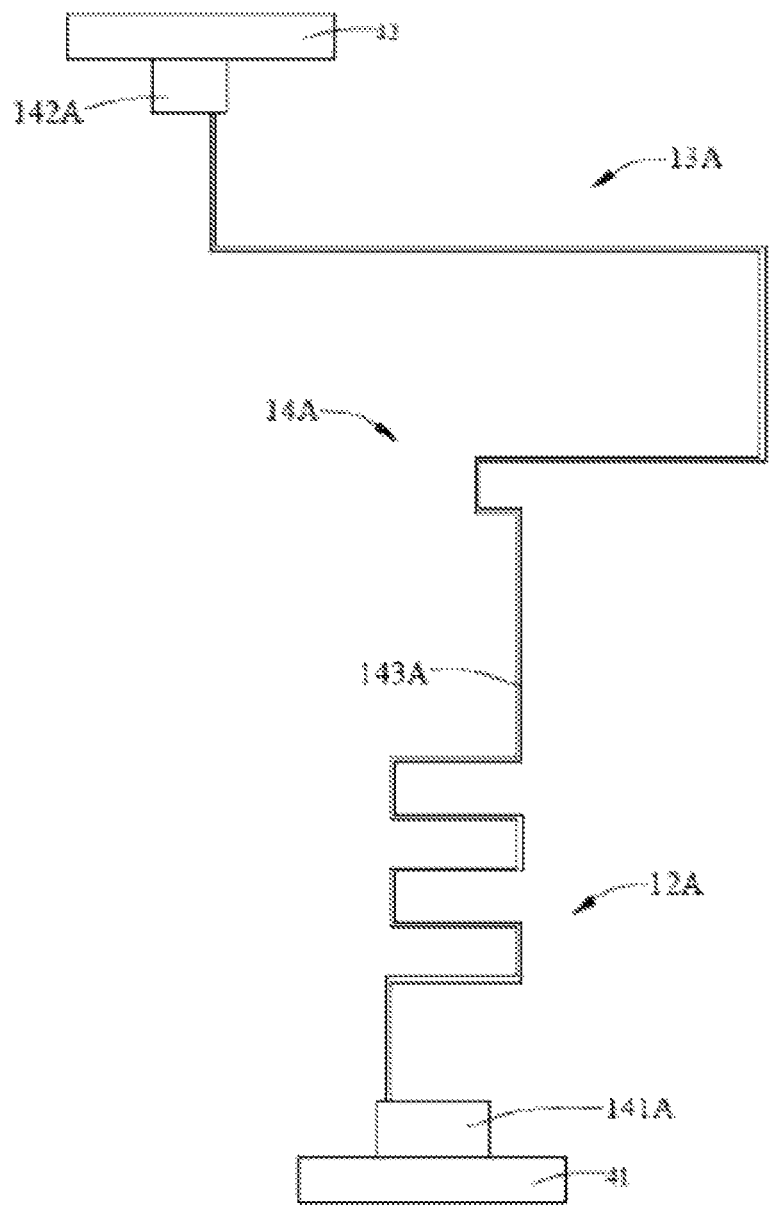
FIG. 9 is a side view of a first changing type of the vehicle load metering device in FIG. 2.

With reference to FIG. 9, a first changing type of the first embodiment of the displacement sensor 11 in accordance with the present invention, the displacement sensor 11 does not have the fixing element 12A and the moving element 13A, the oil storage box 142A is directly and securely mounted on the upper supporting board 42, the pressure transmitter 141A is directly and securely mounted on the lower supporting board 41, and the connecting hose 143A is connected to the oil storage box 142A and the pressure transmitter 141A, and this also an provide a detecting effect as the above-mentioned effect of the first embodiment of the displacement sensor 11 in FIG. 2.

Figure 10:
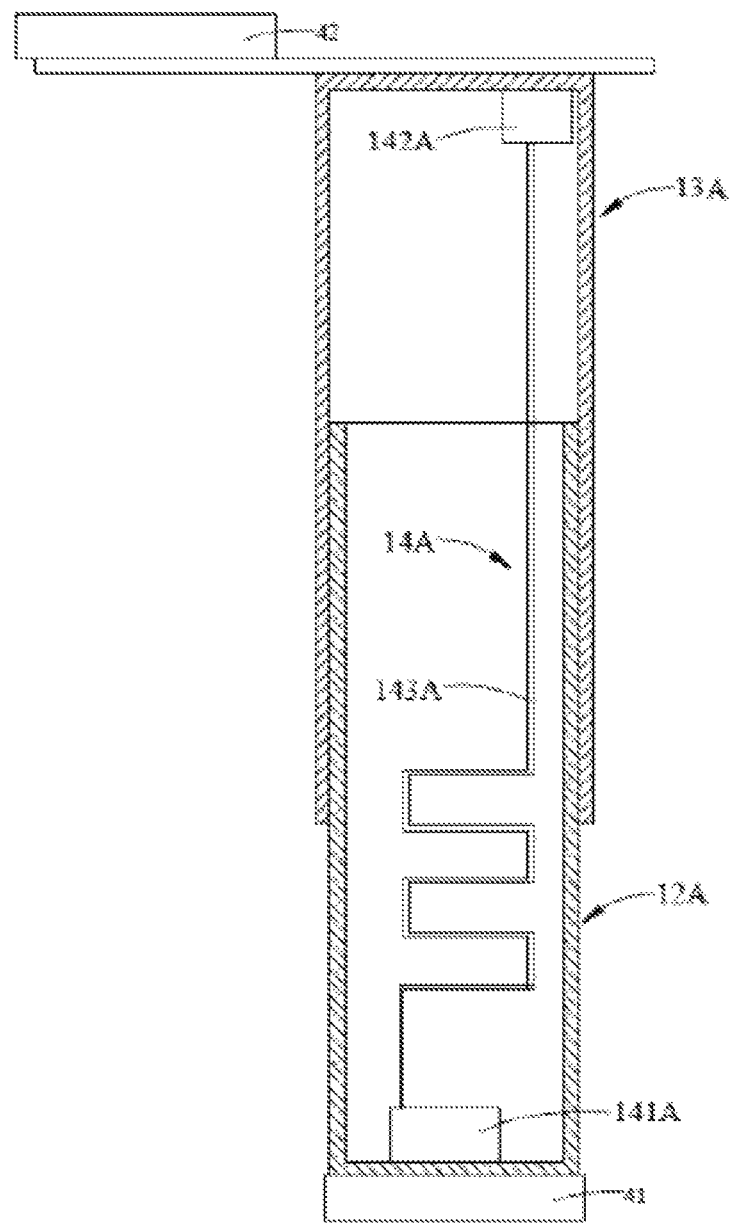
FIG. 10 is a side view in partial section of a second changing type of the vehicle load metering device in FIG. 2.
Figure 11:
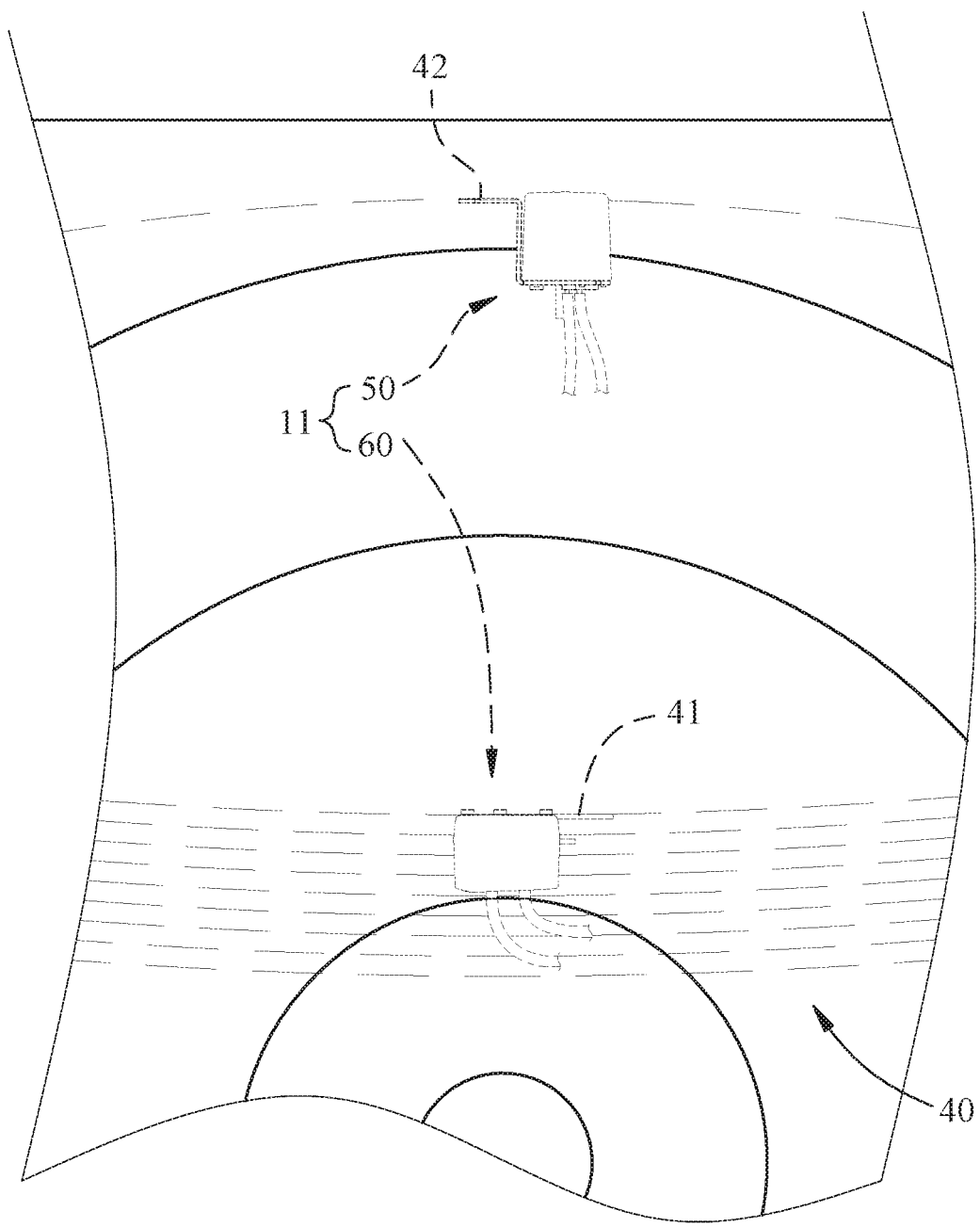
FIG. 11 is a perspective view illustrating a preferred embodiment of the present invention.
Figure 12:
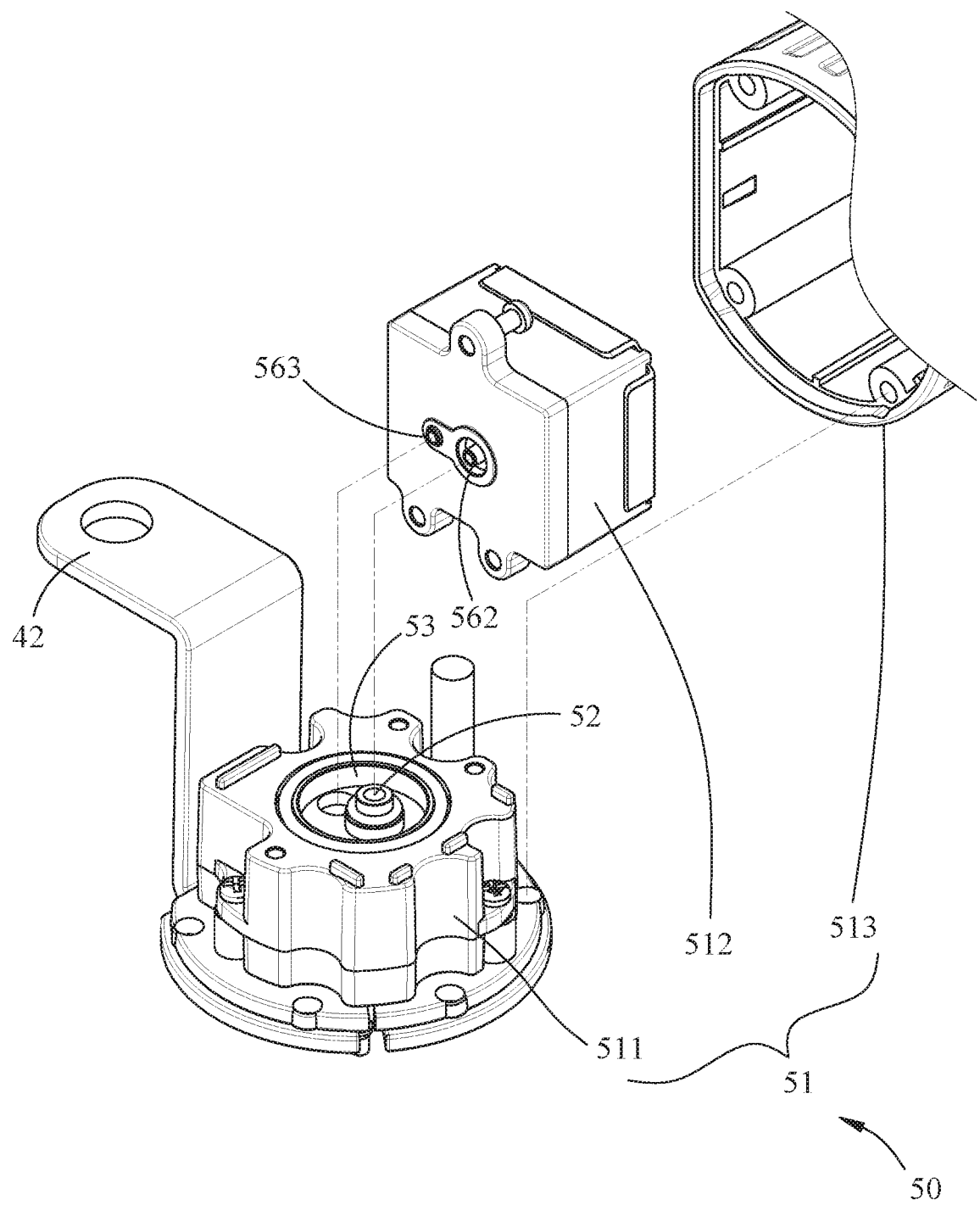
FIG. 12 is an explosive view illustrating a sensing unit of a preferred embodiment of the present invention.
Figure 13:
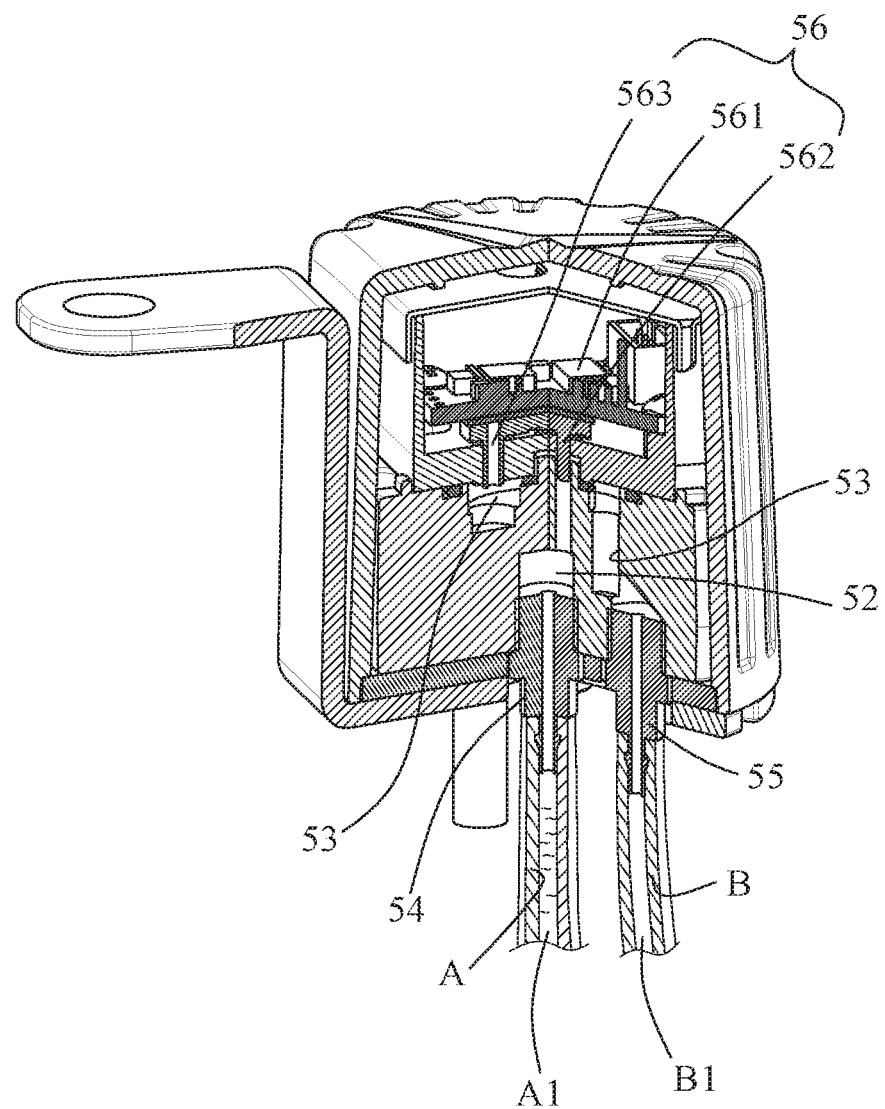
FIG. 13 is a cross-sectional view illustrating the sensing unit of a preferred embodiment of the present invention.
Figure 14:
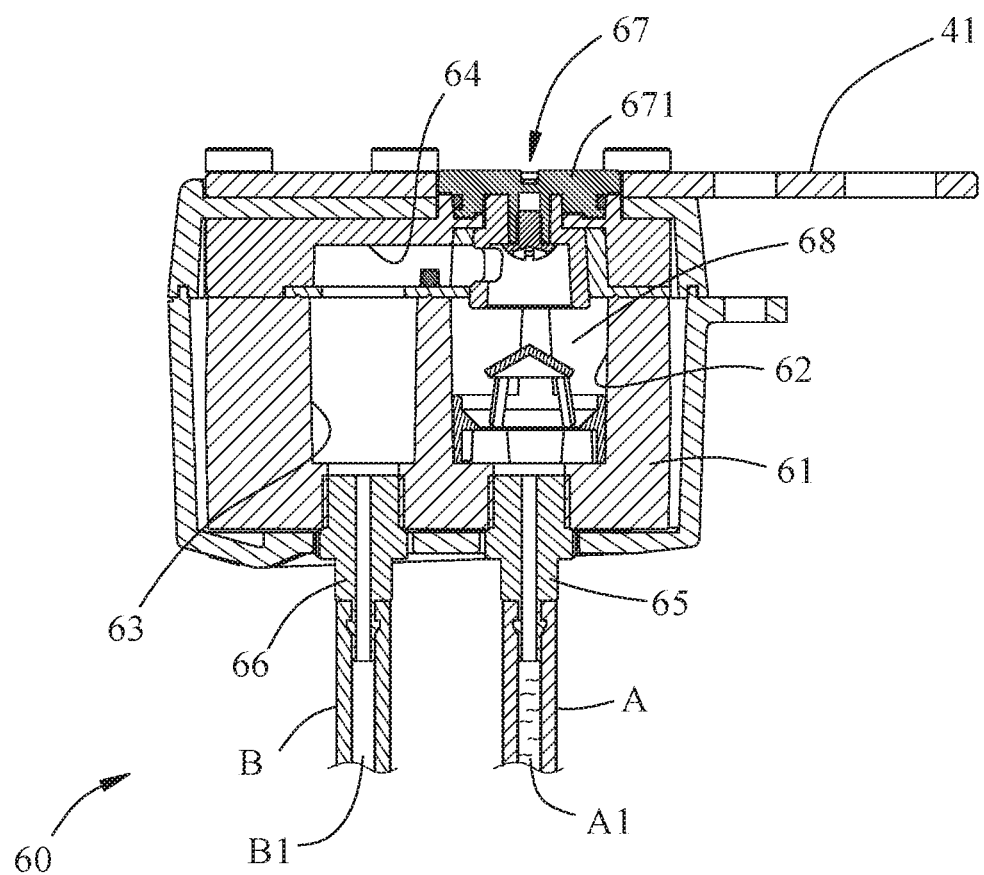
FIG. 14 is a cross-sectional view illustrating a hydraulic tank of a preferred embodiment of the present invention.
Figure 15:
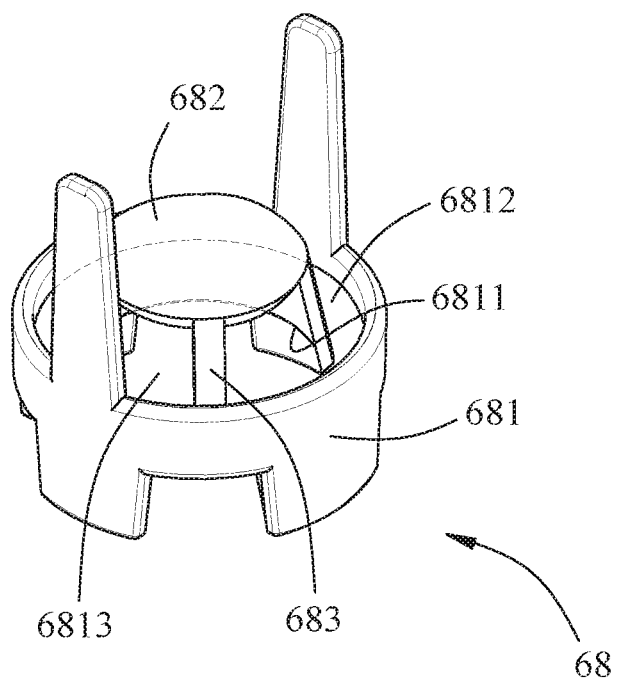
FIG. 15 is a perspective view of a wave absorption unit of a preferred embodiment of the present invention.

With reference to FIG. 10, a second changing type of the first embodiment of the displacement sensor 11 in accordance with the present invention, the displacement sensor 11 has at least one transitional frame 121, the oil storage box 142A and/or the pressure transmitter 141A are connected to the upper supporting board 42 and/or the lower supporting board 41 via the at least one transitional frame 121, and this enables the oil storage box 142A and the pressure transmitter 141A have the variability of the installation position without limiting by the positions of the upper supporting board 42 and the lower supporting board 41. Then, the oil pressure box 142A is moved with the upper supporting board 42 via the transitional frame 121, and is moved with the moving element 13A relative to the pressure transmitter 141A.

Figure 3:
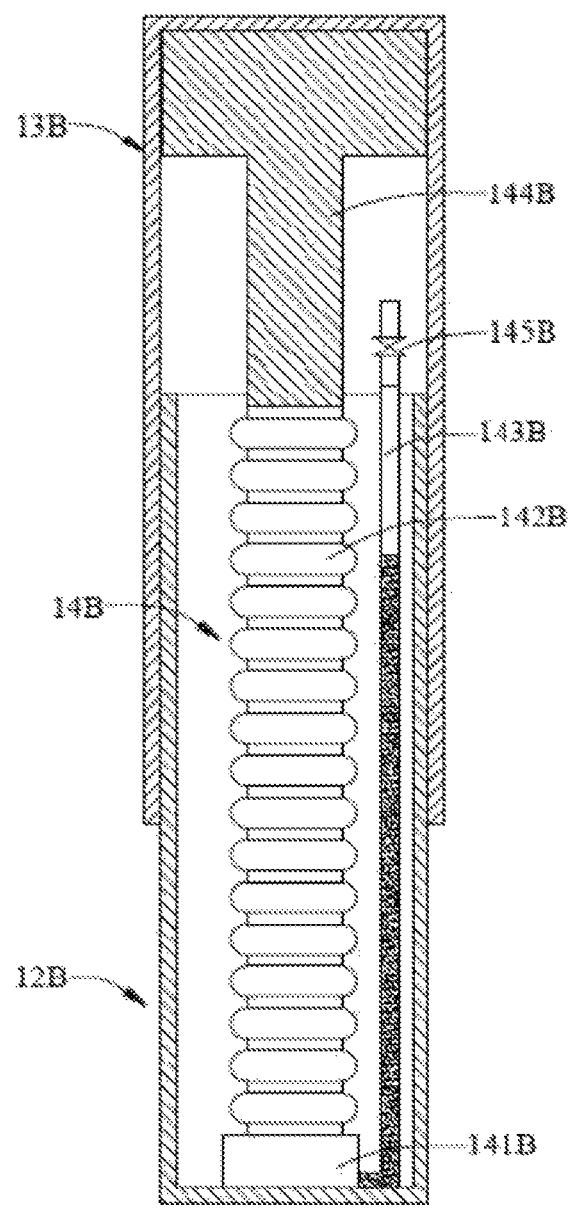
FIG. 3 is a side view in partial section of a second embodiment of a vehicle load metering device in accordance with the present invention.

With reference to FIG. 3, a second embodiment of a displacement sensor 11 in the present invention, the fixing element 12B is a hollow tube with an upper opening, the moving element 13B is a hollow pipe with a lower opening, and the detecting module 14B has a pressure transmitter 141B, a ripple tube 142B, a connecting hose 143B, and a pressing head 144B. The pressure transmitter 141B is securely mounted in the fixing element 12B. The ripple tube 142B is deposited on the pressure transmitter 141B and is mounted in the fixing element 12B. The connecting hose 143B is mounted in the fixing element 12B and is connected to the pressure transmitter 141B. The detecting module 14B has oil deposited between the ripple tube 142B and the connecting hose 143B. The connecting hose 143B has an end opposite to the pressure transmitter 141B and a valve 145B deposited on the end of the connecting hose 143B. The pressing head 144B is securely mounted in the moving element 13B toward the moving element 12B and abuts against the ripple tube 142B.

When the upper supporting board 42 of the flexible supporting device 40 is moved downwardly toward the lower supporting board 41 by the load of the vehicle, the moving element 13B is moved with the upper supporting board 42. Then, the pressing head 144B presses against the ripple tube 142B to deform the ripple tube 142B. As the ripple tube 142B is deformed by the pressing head 144B, the oil that is deposited between the ripple tube 142B and the connecting hose 143B is moved to change the liquid level of the oil in the connecting hose 143B, and the pressure transmitter 141B may convert the amount of movement of the moving element 13B relative to the fixing element 12B to calculate the amount of displacement of the upper supporting board 42 relative to the lower supporting board 41. Then, the load of the vehicle can be calculated by the amount of displacement. Furthermore, when the moving element 13B directly abuts the ripple tube 142B, the pressing head 144B can be omitting unused.

Figure 4:
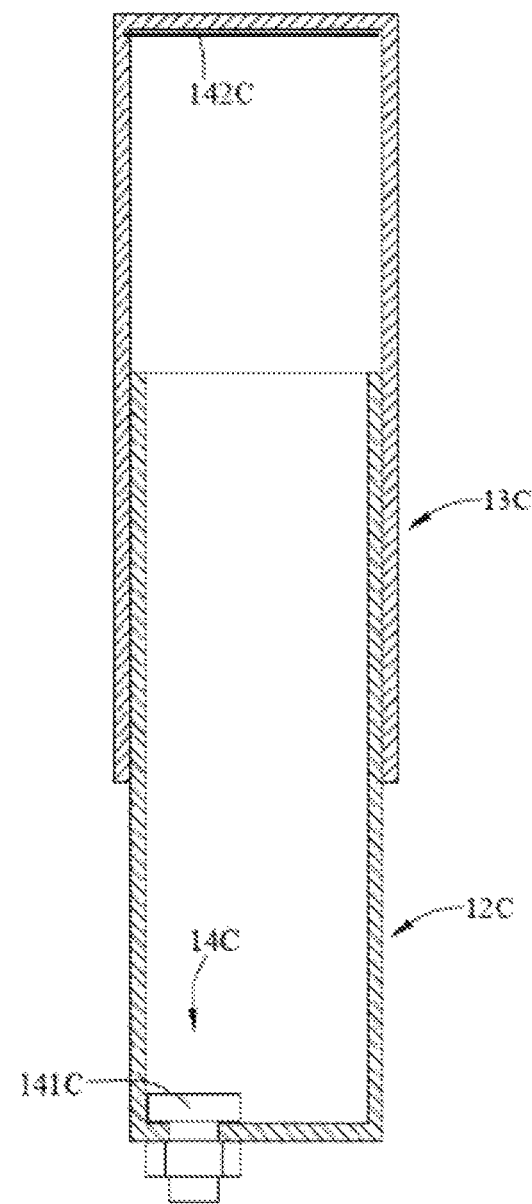
FIG. 4 is a side view in partial section of a third embodiment of a vehicle load metering device in accordance with the present invention.

With reference to FIG. 4, a third embodiment of a displacement sensor 11 in the present invention is an ultrasonic displacement sensor, the fixing element 12C is a hollow tube with an upper opening, the moving element 13C is a hollow pipe with a lower opening, and the detecting module 14C has an ultrasonic transducer 141C and a reflection mirror 142C. The ultrasonic transducer 141C is securely mounted in the fixing element 12C, and the reflection mirror 142C is securely mounted in the moving element 13C and faces the ultrasonic transducer 141C. When the upper supporting board 42 of the flexible supporting device 40 is moved downwardly toward the lower supporting board 41 by the load of the vehicle, the moving element 13C is moved with the upper supporting board 42, and this enables the reflection mirror 142C to move with the moving element 13C relative to the ultrasonic transducer 141C. The amount of movement of the moving element 13C relative to the fixing element 12C can be converted by the ultrasonic transducer 141C receiving the reflected ultrasound of the reflection mirror 142C. Then, the load of the vehicle can be calculated by the amount of displacement of the upper supporting board 42 relative to the lower supporting board 41. In the third embodiment, the ultrasonic transducer 141C can be replaced with a light output form displacement sensor to convert the amount of displacement by detecting the change of the light path.

Figure 5:
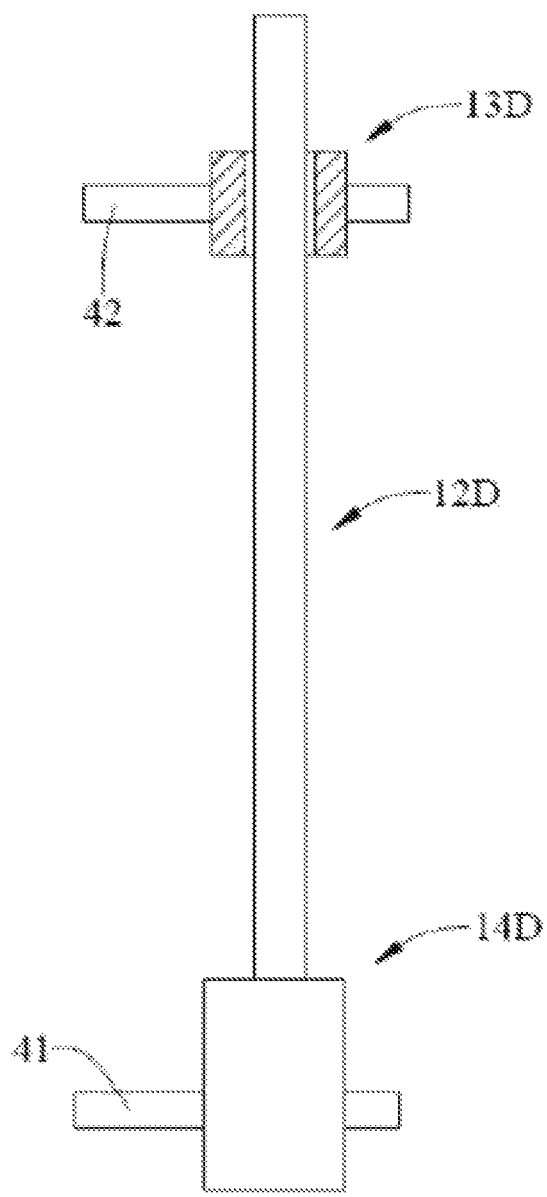
FIG. 5 is a side view in partial section of a fourth embodiment of a vehicle load metering device in accordance with the present invention.

With reference to FIG. 5, a fourth embodiment of a displacement sensor 11 in the present invention is a magnetostrictive displacement sensor, the fixing element 12D is a longitudinal waveguide tube and has a sensitive component deposited in the waveguide tube, and the sensitive component is made of magnetostrictive material. The moving element 13D is a hollow magnetic ring and is mounted around the fixing element 12D. The detecting module 14D has a magnetostrictive sensor securely mounted on a bottom end of the fixing element 12D. Using the magnetostrictive principle, a strain pulse signal is generated by two different magnetic fields to provide a detecting effect. The magnetostrictive sensor may generate a current pulse, and the current pulse may transmit in the waveguide tube to generate a circumferential magnetic field outside the waveguide tube.

When the upper supporting board 42 of the flexible supporting device 40 is moved downwardly toward the lower supporting board 41 by the load of the vehicle, the magnetic ring is moved with the upper supporting board 42, and a strain mechanical wave pulse signal is generated in the waveguide tube by the magnetostrictive principle. The strain mechanical wave pulse signal is transmitted with a fixed sound speed and is detected by the magnetostrictive sensor. Since the transmission time of the strain mechanical wave pulse signal in the waveguide tube is proportional to the distance between the magnetic ring and the magnetostrictive sensor, so that the amount of movement of the moving element 13D relative to the fixing element 12D can be accurately measured by measuring a transmission time. Then, the load of the vehicle can be calculated by the amount of displacement of the upper supporting board 42 relative to the lower supporting board 41.

Figure 6:
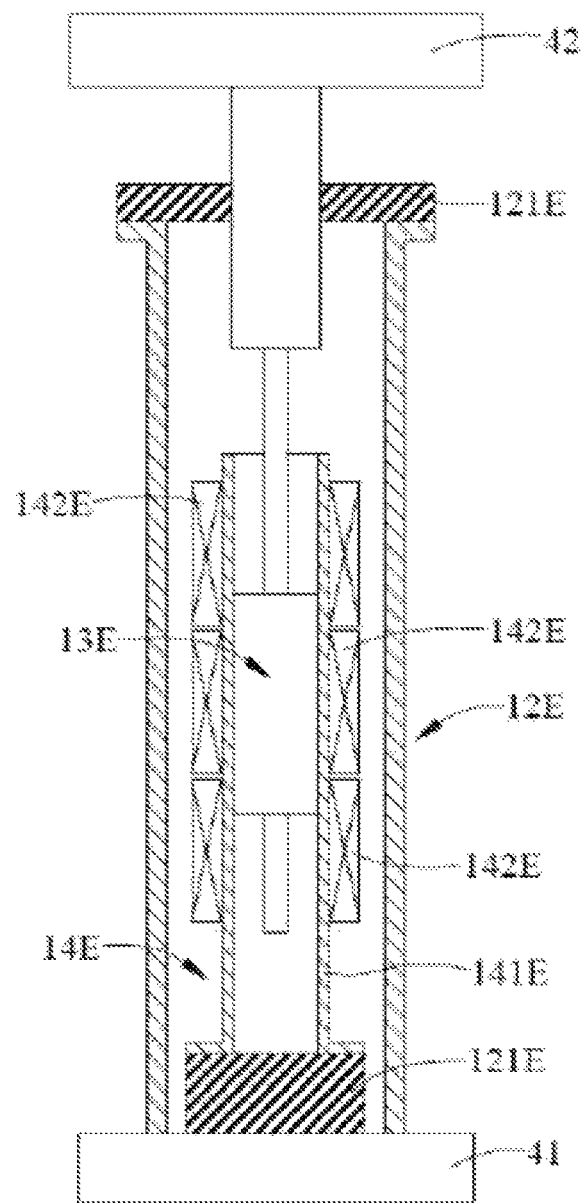
FIG. 6 is a side view in partial section of a fifth embodiment of a vehicle load metering device in accordance with the present invention.

With reference to FIG. 6, a fifth embodiment of a displacement sensor 11 in the present invention is a differential induction coil displacement sensor, the fixing element 12E is a hollow tube with an upper opening, preferably, the fixing element 12E has two anti-collision components 121E made of rubber materials and respectively deposited on a top and a bottom of the fixing element 12E. The moving element 13E is a movable induction bar and extends in the fixing element 12E. The movable induction bar has a top end connected to the upper supporting board 42. The detecting module 14E has a mounting tube 141E and multiple induction coils 142E. The mounting tube 141E is mounted around the movable induction bar, and the induction coils 142E are deposited annularly on an exterior of the mounting tube 141E. Furthermore, the detecting module 14E has three induction coils 142E mounted on the mounting tube 141E from the upper supporting board 42 to the lower supporting board 41 sequentially. The middle induction coil 142E is used to generate an incentive effect to enable the upper and lower induction coils 142E to generate induced oscillations.

In use, when the upper supporting board 42 of the flexible supporting device 40 is moved downwardly toward the lower supporting board 41 by the load of the vehicle, the moving element 13E is moved with the upper supporting board 42, and the movable induction bar is moved relative to the induction coils 142E that are deposited on the mounting tube 141E. The amount of movement of the moving element 13E relative to the fixing element 12E can be converted by a difference of coil induction between the upper induction coil 142E and the lower induction coil 142E. Then, the load of the vehicle can be calculated by the amount of displacement of the upper supporting board 42 relative to the lower supporting board 41.

Figure 7:
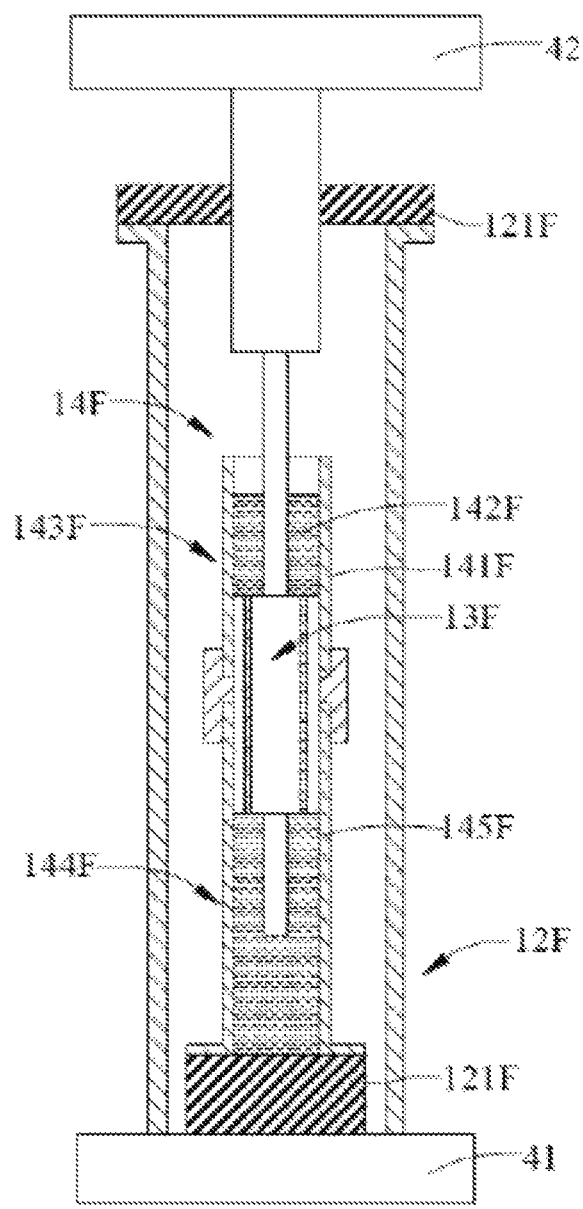
FIG. 7 is a side view in partial section of a sixth embodiment of a vehicle load metering device in accordance with the present invention.

With reference to FIG. 7, a sixth embodiment of a displacement sensor 11 in the present invention is a capacitive displacement sensor, the fixing element 12F is a hollow tube with an upper opening, the moving element 13F is an induction bar and extends in the fixing element 12F. The induction bar has a top end connected to the upper supporting board 42, an insulating film coated on an exterior of the induction bar, and at least one capacitor ground pole mounted through the induction bar. The detecting module 14F has an upper mounting tube 141F, a lower mounting tube 145F, and a dielectric 142F. The upper mounting tube 141F and the lower mounting tube 145F are mounted on the exterior of the induction bar beside the insulating film. The dielectric 142F is deposited between the upper mounting tube 141F, the lower mounting tube 145F, and the induction bar to form two capacitances 143F, 144F between the upper mounting tube 141F, the induction bar, and the lower mounting tube 145F.

In use, the upper supporting board 42 of the flexible supporting device 40 is moved downwardly toward the lower supporting board 41 by the load of the vehicle, the moving element 13F is moved with the upper supporting board 42, and the induction bar is moved relative to the upper mounting tube 141F and the lower mounting tube 145F. The dielectric 142F is flowed between the two capacitances 143F, 144F via a through hole of the moving element 13F, and this may change the capacitance values of the two capacitances 143F, 144F. The amount of movement of the moving element 13F relative to the fixing element 12F can be converted by the change of the capacitance values of the two capacitances 143F, 144F. Then, the load of the vehicle can be calculated by the amount of the displacement of the upper supporting board 42 relative to the lower supporting board 41.

Figure 8:
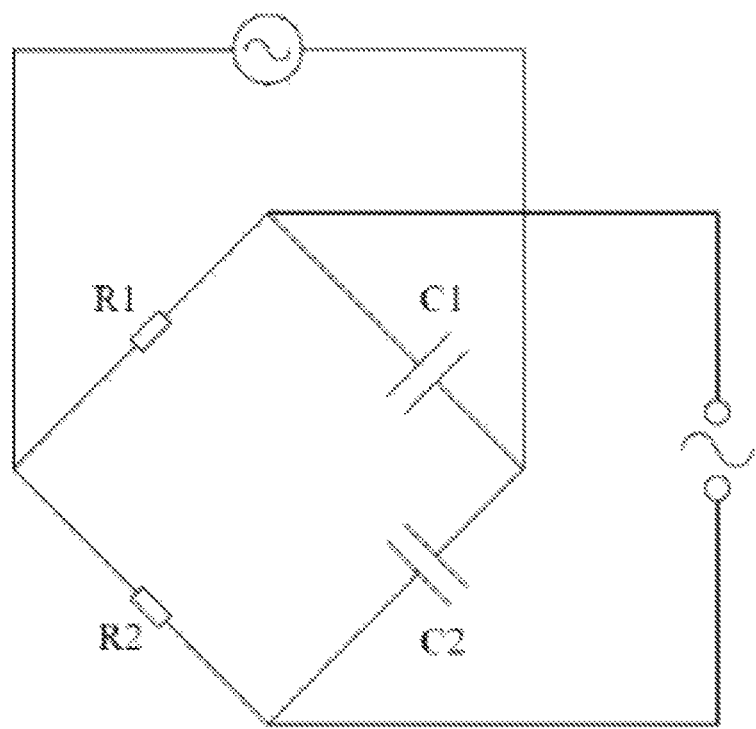
FIG. 8 is a circuit configuration diagram of the vehicle load metering device in FIG. 7.

An equivalent circuit diagram for detecting the difference of capacitance values of the two capacitances 143F, 144F is shown in FIG. 8, the capacitance 143F is connected to the capacitance 144F in series to detect the difference of capacitance values, inductances, and resistance change between the two capacitances 143F, 144F to calculate the above-mentioned amount of displacement. In the present invention, the circuit uses two resistors to form a half bridge, and the other half bridge is the capacitance; the following changes in inductance can also use this bridge, which half bridge for the resistance, the other half bridge is the inductor, can offset many changes in environmental factors caused changes, reduce the sensing error.

The preferred embodiments are only the forms of the displacement sensors enumerated in the present invention, and therefore do not limit the other types. Each one of the displacement sensors 11 may be a laser displacement sensor, a Hall type displacement sensor, a photoelectric displacement sensor, a magnetic displacement sensor or a vortex displacement sensor, etc. That is, a displacement sensor capable of measuring the amount of displacement between the two supporting boards 41, 42 of each one of the flexible supporting devices 40, should be the technical features disclosed in the present invention.

The signal processing/transmission module 20 is connected to the displacement sensing module 10 to process and transmit signals that are detected by the displacement sensors 11 of the displacement sensing module 10. In addition, the signal processing/transmission module 20 may be formed with the displacement sensing module 10 as a single piece. The signal processing/transmission module 20 has multiple signal processor/transmitters respectively connected to the displacement sensors 11 of the displacement sensing module 10. Furthermore, each one of the signal processor/transmitters may be wired signal transmission or wireless signal transmission, such as Bluetooth, infrared or wireless network signals, etc.

The signal receiving/processing module 30 is connected to the signal processing/transmission module 20 to receive, process, and aggregate signals that are transmitted from the signal processing/transmission module 20 by a wired or a wireless (blue-tooth) way. Furthermore, the signal receiving/processing module 30 may be a car instrument, an instrument box, a global positioning system (GPS), a telephone, a mobile device, or a computer that is deposited on the vehicle. The car instrument has a display, operating buttons, and sms capability, and may transmit the detecting information to a data center. After receiving the related signals, the signal receiving/processing module 30 may be calculate and provide a warning to the users or the drivers.

With reference to FIG. 11 to FIG. 16 illustrating the preferred embodiment of the present invention, the displacement sensor 11 further includes a sensing unit 50 and a hydraulic tank 60, the sensing unit 50 and the hydraulic tank 60 are respectively connected with the supporting board 41 located at an upper position and the supporting board 42 located at a lower position relative to the displacement sensor 11; in which:

The sensing unit 50 has a sensing unit body 51, and the sensing unit body 51 includes a base 511, a sensing module container 512, and an upper cover 513, a sensing hydraulic cavity 52 and a sensing pressure cavity 53 are disposed inside the base 511, the top ends and the bottom ends of the sensing hydraulic cavity 52 and the sensing pressure cavity 53 are penetrated through the top side and the bottom side of the base 511, respectively, the bottom end of the sensing hydraulic cavity 52 and the bottom end of the sensing pressure cavity 53 are respectively connected to a sensing hydraulic port 54 and a sensing pressure port 55, and the sensing hydraulic port 54 and the sensing pressure port 55 are extended outwardly from the sensing unit body 51.

The sensing module container 512 is connected and fixed onto the top side of the base 511, and the bottom of the sensing module container 512 is connected to a detecting module 56, the detecting module 56 has a circuit board 561, the bottom of the circuit board 56 is connected with a hydraulic sensor 562 and an barometer sensor 563, and corresponding to the positions of the sensing hydraulic cavity 52 and the sensing pressure cavity 53, the hydraulic sensor 562 and the barometer sensor 563 are penetrated outwardly from the bottom of the sensing module container 512 so as to respectively extend into the top end of the sensing hydraulic cavity 52 and the top end of the sensing pressure cavity 53; the upper cover 513 covers the base 511 and the sensing module container 512, and the bottom edge of the upper cover 513 is surrounded along the periphery of the base 511.

The hydraulic tank 60 has a hydraulic tank body 61, a hydraulic cavity 62 and an pressure cavity 63 are formed inside the hydraulic tank body 61, the bottom ends of the hydraulic cavity 62 and the pressure cavity 63 are respectively penetrated through the bottom of the hydraulic tank body 61, the top end of the hydraulic cavity 62 and the pressure cavity 63 forms a channel 64, the bottom ends of the hydraulic cavity 62 and the pressure cavity 63 are respectively assembled with a hydraulic cavity port 65 and an pressure cavity port 66, an hydraulic tube A is interconnected between the hydraulic cavity port 65 and the sensing hydraulic port 54, a liquid µl is filled in the hydraulic tube A, and the liquid µl is preferably silicon oil. An air tube B is interconnected between the pressure cavity port 66 and the sensing pressure port 55, in which the air tube B contains air B1.

Figure 16:
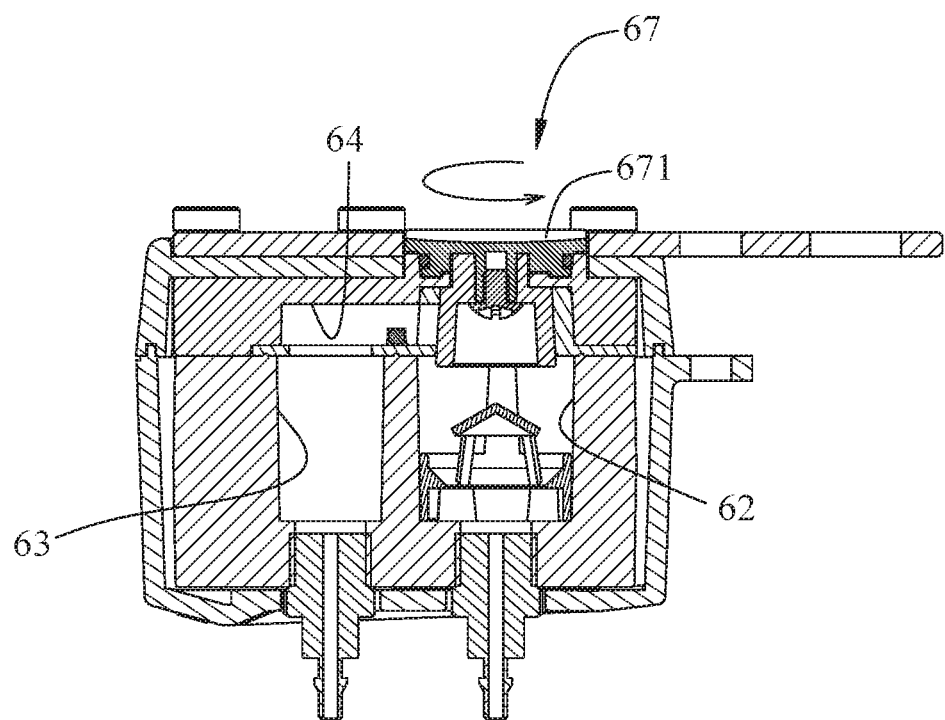
FIG. 16 is another cross-sectional view illustrating the hydraulic tank of the preferred embodiment of the present invention.

A switch valve 67 is installed in the channel 64, and the upper part of the switch valve 67 has a rotary shaft 671. The rotary shaft 671 is exposed from the top side of the hydraulic tank body 61, and by turning the rotary shaft 671, the switch valve 67 can be turned on or off, so as to close of open the channel 64. In practice, while using the displacement sensor 11 to measure the displacement in the up-and-down direction of the supporting boards 41 and 42, as shown in FIG. 16, the switch valve 67 is turned on, so that the pressures in the hydraulic tube A and the air tube B would connect with each other.

A wave absorbing unit 68 is embedded inside the hydraulic cavity 62, and the wave absorbing unit 68 includes an outer ring 681, a cap 682, and a number of supporting ribs 683. The outer ring 681 is a ring-shaped component and embedded in the bottom part of the hydraulic cavity 62, the inner surface of the outer ring 681 has a neck portion 6811 having a radius smaller than the outer ring 681, the top side of the neck portion 6811 has a ring-shaped inclined surface 6812, and a through hole 6813 is formed at the center of the neck portion 6811. The cap 682 is disposed right above the through hole 6813 and is higher than the outer ring 681, the aforementioned supporting ribs 683 are arranged circumferentially along and connected between the outer-periphery of the cap 682 and the inner-periphery of the neck portion 6811.

When the liquid µl is flown through the through hole 6813 of the wave absorption unit 68, the liquid µl itself may cause damping effect so as to absorb shock waves that cause noise to the hydraulic sensor 562 while detecting pressure changes of the liquid µl. Besides, the flow of the liquid µl is limited by the neck portion 6811 and at least partially blocked by the cap 682, so that the liquid µl is buffered and that the waving is suppressed, thereby eliminating noises detected by the electrically sensitive hydraulic sensor 562 while measuring pressure changes, so as to obtain more uniformed results.

When the supporting board 42 of the flexible supporting device 40 is displaced relative to the supporting board 41 due to an increment of the weight loading of the vehicle, the distance between the sensing unit 50 and the hydraulic tank 60 is shortened causing a pressure change of the liquid µl, such pressure change can then be measured by the hydraulic sensor 562, thereby obtaining the displacement of the sensing unit 50 relative to the hydraulic tank 60, and while using the pressure change of the air B1 measured by the barometer sensor 563 as a reference base for calibration, the displacement of the supporting board 42 on the upper side relative to the supporting board 41 of the lower side can be obtained, so that the weight load of the vehicle can be finally calculated with the measured and calibrated displacement.

According to the above-mentioned structural relationships and features, the vehicle load metering device in accordance with the present invention, in use, each one of the displacement sensors 11 of the displacement sensing module 10 is assembled between the two supporting boards 41, 42 of each one of the flexible supporting devices 40 of a vehicle, and a amount of displacement between the two supporting boards 41, 42 can be detected by the displacement sensor 11 to calculate the load of the vehicle. Then, the detecting signals are transmitted to the signal processing/transmission module 20 and are received and processed by the signal receiving/processing module 30 to enable the drivers, the maintenance center or the logistics management material center to obtain the load of the vehicle clearly and accurately.

Additionally, the vehicle load metering device does not need to disassemble after metering the load of the vehicle, and this is convenient in use rather than the conventional track scale. Furthermore, since the vehicle load metering device does not need to disassemble after metering, so the user may obtain the load of the vehicle immediately and at any time. Consequently, the driver may immediately monitor the conditions of the vehicle, such as when the vehicle is running if the items fall, the driver can receive the notification signal, and can immediately respond to reduce the loss or harm.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A vehicle load metering device deposited on one of flexible supporting devices of a vehicle suspension system between two supporting boards, and the vehicle load metering device comprising:
    a displacement sensing module having multiple displacement sensors respectively mounted on the flexible supporting devices of the vehicle suspension system, and each one of the displacement sensors connected to two supporting boards of a corresponding flexible supporting device to detect amount of displacement between the two supporting boards; wherein:
    the displacement sensors includes a sensing unit and a hydraulic tank, the sensing unit and the hydraulic tank are respectively connected with the two supporting boards, and the two supporting boards are located at an upper position and a lower position, respectively, the sensing unit has a sensing unit body, a hydraulic cavity is formed in the sensing unit body, an end of the hydraulic cavity is connected with a sensing hydraulic port, a detecting module is connected with the sensing unit body, the detecting module has a hydraulic sensor extended into the sensing hydraulic cavity;
    the hydraulic tank has a hydraulic tank body, a hydraulic cavity is formed in the hydraulic tank body, an end of the hydraulic cavity is connected with a hydraulic cavity port, a hydraulic tube is interconnected between the hydraulic cavity port and the sensing hydraulic port, a liquid is contained in the hydraulic tube; a wave absorption unit is embedded in the hydraulic cavity, the wave absorption unit includes an outer ring, a cap, and a plurality of supporting ribs, the outer ring is in a ring-shape and is fixed inside the hydraulic cavity, a neck portion is formed at an upper portion of an inner surface of the outer ring having a smaller radius, a through hole is formed at a center of the neck portion, the cap is disposed on top of and aligned with the through hole, the cap is farther than the outer ring with reference to the hydraulic cavity port, the plurality of supporting ribs are arranged at interval and circumferentially connected along an outer-periphery of the cap and an inner-periphery of the neck portion; and
    a signal processing/transmission module connected to the displacement sensing module to process and transmit signals that are detected by the displacement sensors of the displacement sensing module, and having multiple signal processor/transmitters respectively connected to the displacement sensors of the displacement sensing module.

2. The vehicle load metering device as claimed in claim 1, wherein a channel is formed between the other end of the pressure cavity and the other end of the hydraulic cavity, a switch valve is disposed in the channel, the switch valve has a rotary shaft, the rotary shaft is exposed from a surface of the hydraulic tank body, whereby the switch valve is controlled to be on or off by operating the rotary shaft in a turning manner.

3. The vehicle load metering device as claimed in claim 1, wherein a sensing pressure cavity is formed in the sensing unit body, an end of the sensing pressure cavity is connected with a sensing pressure port, a barometer sensor is disposed in the detecting module, the barometer sensor is extended into the pressure cavity; a pressure cavity is formed in the hydraulic tank body, an end of the pressure cavity is connected with a pressure cavity port, an air tube is interconnected between the pressure cavity port and the sensing pressure port, an air is contained in the air tube.

4. The vehicle load metering device as claimed in claim 3, wherein a channel is formed between the other end of the pressure cavity and the other end of the hydraulic cavity, a switch valve is disposed in the channel, the switch valve has a rotary shaft, the rotary shaft is exposed from a surface of the hydraulic tank body, whereby the switch valve is controlled to be on or off by operating the rotary shaft in a turning manner.

* * * * *